(12) United States Patent  
Byun

(10) Patent No.: US 8,804,164 B2  
(45) Date of Patent: Aug. 12, 2014

(54) IMAGE FORMING SYSTEM AND CONTROL METHOD USING MIDDLEWARE

(75) Inventor: Hyung-sik Byun, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1173 days.

(21) Appl. No.: 12/034,879

(22) Filed: Feb. 21, 2008

(65) Prior Publication Data

US 2009/0002740 A1   Jan. 1, 2009

(30) Foreign Application Priority Data

Jun. 26, 2007  (KR) ........................ 10-2007-0063034

(51) Int. Cl.  
*G06F 3/12* (2006.01)

(52) U.S. Cl.  
USPC .......................................................... 358/1.15

(58) Field of Classification Search  
CPC .. H04N 1/00127; H04N 1/00954; H04N 1/32  
USPC ........................... 358/1.13, 1.14, 1.15; 710/62  
See application file for complete search history.

(56) References Cited

U.S. PATENT DOCUMENTS 6,980,312 B1 * 12/2005 Czyszczewski et al. ..... 358/1.15  
7,627,580 B2 * 12/2009 Fujii ...................................... 1/1

2005/0044197 A1 * 2/2005 Lai .................................. 709/223  
2007/0022233 A1   1/2007 Bridges et al.  
2007/0198996 A1 * 8/2007 Chiu et al. .................... 719/321

FOREIGN PATENT DOCUMENTS

KR    10-2006-0021031    3/2006  
WO       2007/044589    4/2007

OTHER PUBLICATIONS

Office Action, mailed May 6, 2011, in Chinese Application No. 200810093050.3.  
Korean Notice of Preliminary Rejection issued Nov. 6, 2013 in corresponding Korean Application No. 10-2007-0063034.

* cited by examiner

*Primary Examiner* — Benny Q Tieu  
*Assistant Examiner* — Sunil Chacko  
(74) *Attorney, Agent, or Firm* — Staas & Halsey LLP

(57) ABSTRACT

A job control device, a multifunction device, and an operation method thereof are provided. The job control device includes a middleware unit that supports connection with a multifunction device comprising multiple devices having independent functions, and a job control unit that controls performing of a job by at least one device from among the plurality of devices through the middleware unit. A multifunction device includes a multiple devices that have independent functions and a middleware unit that requests a job call to the job control device. A device, from among the plurality of devices, called from the job control device through the middleware unit executes a corresponding function.

19 Claims, 5 Drawing Sheets

IMAGE FORMING SYSTEM AND CONTROL METHOD USING MIDDLEWARE

CROSS-REFERENCE TO RELATED APPLICATION

This application claims the benefit of Korean Application No. 2007-63034, filed Jun. 26, 2007 in the Korean Intellectual Property Office, the disclosure of which is incorporated herein by reference.

BACKGROUND OF THE INVENTION

1. Field of the Invention

Aspects of the present invention relate to a job control device, a multifunction device, and an operation method thereof. More particularly, aspects of the present invention relate to a job control device and a multifunction device designed to easily cope with a change in job control software, and an operation method thereof.

2. Description of the Related Art

In the past, the electronic devices that were in use, such as printers, scanners, or facsimile machines, generally only had a single function for each single device. Today, however, multifunction devices, which have diverse functions in one unit, have become widespread.

FIG. 1 is a block diagram of a conventional multifunction device. In FIG. 1, a multifunction device 1 includes devices 10 such as a printer 12, a scanner 14, a facsimile machine 16 and a medium 18. The printer 12, the scanner 14, the facsimile machine 16 and the medium 18 mounted in the multifunction device 1 can each perform independent functions.

The devices 10 are grouped together in the multifunction device 1 to provide functions such as copying and printing. To this end, software is required to control the devices 10 in the multifunction device 1. A piece of software that performs such a task is called a job control unit 30.

For example, if a user inputs a command through a user interface (UI) unit 20 in order to carry out copying and the input command is received by the job control unit 30, the job control unit 30 directs the scanner 14 to perform scanning and directs the printer 12 to print the scanned data.

The multifunction device 1 provides diverse functions such as N-up copying, reduced or enlarged copying, and transmission of copies to a host server, as well as simple copying. Such diverse functions require a change in the job control unit 30. The job control unit 30 is changed according to the requirements of a user or the situation of a manufacturer. In addition, the job control unit 30 is changed to suit multifunction devices 1 whenever the multifunction devices 1 are manufactured.

In order to facilitate the change of the job control unit 30, a solution multifunction device has been described. There are two types of solution multifunction devices. One is installed with a platform inside to download and execute a program suitable for the user environment thereof. The other controls functions in a network environment.

Building a platform and providing an interface environment using such solution multifunction devices is very expensive. In order to build a platform, the hardware used includes a high capacity memory and a high performance central processing unit (CPU), and a test environment for applications is necessary. Furthermore, in order to use the network environment, a basic environment that uses interface functions of a solution multifunction device on the web (such as the Site Open application programming interface (SOA)) has to be built.

SUMMARY OF THE INVENTION

An aspect of the present invention provides a job control device to facilitate the change of job control software without additional hardware by controlling jobs between a host and a multifunction device based on a middleware environment.

According to an embodiment of the present invention, there is provided a job control device comprising a middleware unit that supports connection with a multifunction device comprising a plurality of devices having independent functions, and a job control unit that controls a performing of a job by at least one device from among the plurality of devices through the middleware unit.

According to an aspect of the present invention, if the multifunction device requests a job call, the job control unit selects and operates a device from among the plurality of devices to perform the job.

According to an aspect of the present invention, if two or more devices are needed to perform the job, the job control unit selects and sequentially operates the two or more devices according to the order specified by the job.

According to an aspect of the present invention, the middleware unit defines interfaces for the plurality of devices and constructs communication mechanism environmental elements of the defined interfaces.

According to another embodiment of the present invention, there is provided a method of operating a job control device that controls jobs of a multifunction device comprising a plurality of devices having independent functions, the operation method comprising receiving a request for a job call from the multifunction device, and selecting and controlling a job of at least one device from among the plurality of devices to execute a function specified by the job through a middleware unit that supports connection with the multifunction device.

According to an aspect of the present invention, in the controlling of the job, if the multifunction device requests the job call, a device to perform the job is selected from among the plurality of devices and is operated.

According to an aspect of the present invention, in the controlling of the job, if two or more devices are needed to perform the job, the job control unit selects and sequentially operates the two or more devices according to the order specified by the job.

According to an aspect of the present invention, the operation method further comprises defining interfaces for the plurality of devices, and constructing communication mechanism environmental elements of the defined interfaces.

According to an aspect of the present invention, the middleware unit executes middleware programming such as Common Object Request Broker Architecture (CORBA), Remote Method Invocation (RMI), or Component Object Model (COM+).

According to another embodiment of the present invention, there is provided a multifunction device comprising a plurality of devices that have independent functions, and a middleware unit that requests a job call to a job control device, wherein a device, from among the plurality of devices, called from the job control device through the middleware unit executes a corresponding function.

According to an aspect of the present invention, the multifunction device further comprises a user interface unit that receives a job execution request signal from a user.

According to an aspect of the present invention, the job control device is a user terminal or a job control dedicated device.

According to an aspect of the present invention, after the device called from the job control device executes the function, the middleware unit informs the job control device of the result of the operation of the device.

According to an embodiment of the present invention, there is provided an method of operating a multifunction device comprising a plurality of devices having independent functions, the operation method comprising requesting a job call through a middleware unit which supports connection with a job control device, and performing a function of a device, from among the plurality of devices, called from the job control device through the middleware unit.

According to an aspect of the present invention, the method further comprises receiving a job execution request signal from a user.

According to an aspect of the present invention, the job control device is a user terminal or a job control dedicated device.

According to an aspect of the present invention, the middleware unit executes middleware programming such as Common Object Request Broker Architecture (CORBA), Remote Method Invocation (RMI), or Component Object Model (COM+).

According to another embodiment of the present invention, there is provided a multifunction device comprising a plurality of devices having independent functions and a job control device comprising a first job control unit that controls a performing of a job by at least one device from among the plurality of devices, wherein the job control device includes a first middleware unit that supports connection of the job control unit with the multifunction device to control a performing of a job by at least one device from among the plurality of devices, and wherein the multifunction device includes a second middleware unit that supports connection of the multifunction device with the job control device to provide a job call requests to the job control device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
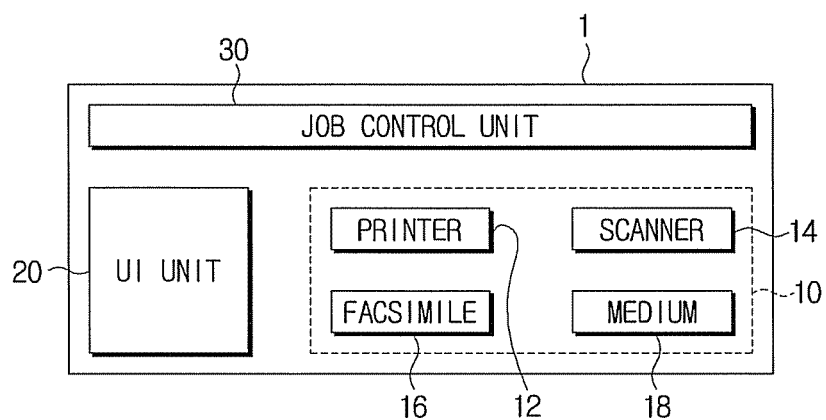
FIG. 1 is a block diagram of a conventional multifunction device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
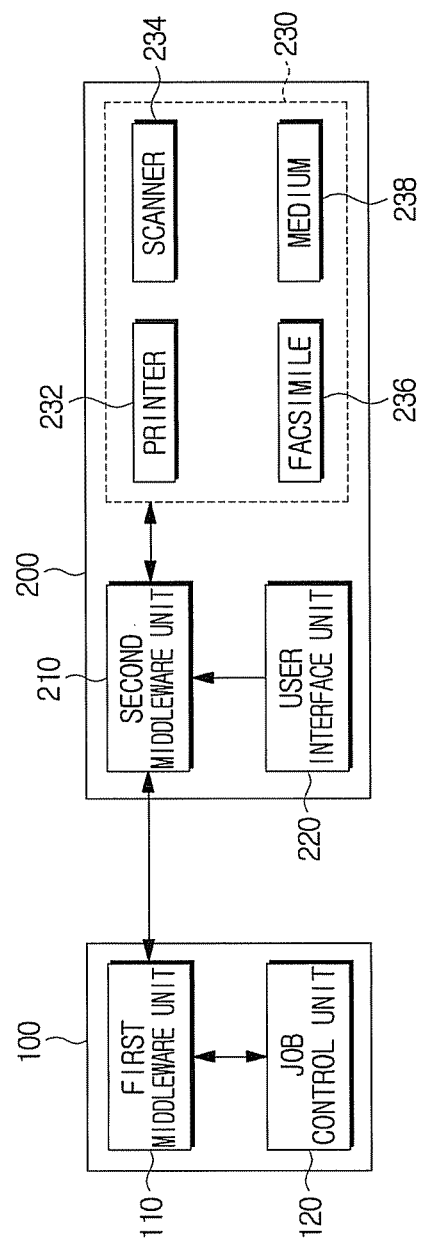
FIG. 2 is a block diagram of a job control system according to an embodiment of the present invention.

FIG. 2 is a block diagram of a job control system according to an embodiment of the present invention. The job control system comprises a job control device 100 and a multifunction device 200. The job control device 100 may be a user terminal (such as, for example, a computer) or a job control dedicated device.

The job control device 100 and the multifunction device 200 are connected to each other through middleware. Generally, the term "middleware" refers to software that connects two separate pieces of software. Middleware applied to aspects of the present invention may take the form of Common Object Request Broker Architecture (CORBA), Remote Method Invocation (RMI), and/or Component Object Model (COM+), but is not limited thereto.

The job control device 100 comprises a first middleware unit 110 and a job control unit 120. If the job control device 100 is a user terminal (such as, for example, a computer, a personal digital assistant, etc.), the job control device 100 can be installed with diverse applications and a printer driver, as well as the first middleware unit 110 and a job control unit 120. Since printer drivers are well known in the related art, a detailed description of printer drivers is not repeated. Since the multifunction device 200 also includes a middleware unit, in order to differentiate the middleware unit in the job control device 100 and the middleware unit in the multifunction device 200, the middleware in the job control device 100 is referred to as the "first middleware unit 110" and the middleware unit in the multifunction device 200 is referred to as the "second middleware unit 210." The first middleware unit 100 and the second middleware unit 200 execute the middleware software.

The first middleware unit 110 mediates a connection between the job control device 100 and the multifunction device 200. For example, the first middleware unit 110 transmits signals from the multifunction device 200 to the job control unit 120 and transmits signals from the job control unit 120 to the multifunction device 200. The first middleware unit 110 defines interfaces and controls jobs for a plurality of devices 230 in the multifunction device 200. The definition of the interfaces for the plurality of devices includes the name of the interface, a factor to provide when the interface is called, and a type of factor.

In order to define interfaces for the plurality of devices, an interface definition language (IDL) is used. If interfaces for the plurality of devices 230 are defined using the IDL, a skeleton file (which consists of a server-dedicated source code), and a stub file (which consists of a client-dedicated source code), are generated by compilation using a pre-determined programming language. The first middleware unit 110 executes a connection to the plurality of devices using these files.

The job control unit 120 controls at least one device 230 of the multifunction device 200 to perform a certain function. At times, two or more devices 230 may be used to execute a single function. For example, to perform scanning, a document is scanned and printed, using the scanner 234 and printer 232. To perform faxing, a fax document is received and printed, using the facsimile machine 236 and the printer 232. The job control unit 120 controls two or more devices in sequence. Control over the sequence of the use of devices is referred to as "flow control."

The job control unit 120 uses the flow control, in which one device completes its operation and then another device is made to operate, to control a single function of the multifunction device 200.

The multifunction device 200 comprises the second middleware unit 210, a user interface unit 220, and the plurality of devices 230. In order to execute a job, the second middleware unit 210 requests a job call to the job control device 100. When a job execution request signal is input from a user through the user interface unit 220 or is input from the job control device 100, a job is executed. A job execution request signal is input from the job control device 100 through a printer driver installed in the job control device 100, and is received by the multifunction device 200 via a network interface. For example, the job execution request signal can be received through a cable connecting the multifunction device 200 and the job control device 100 or can be received wirelessly.

If the middleware is implemented as CORBA, the second middleware unit 210 in the multifunction device 200 can request a job call to the first middleware unit 110 in the job control device 100 through an object request broker (ORB). An ORB is a program that acts as a "broker" from when a client requests a service from a distributed object until the completion of that request.

The user interface unit 220 receives a job execution request signal from a user. The user can input a job execution request signal using a menu provided with the multifunction device 200 or through a dedicated key, but is not limited thereto.

The plurality of devices 230 comprises devices having an independent function, such as a printer 232, a scanner 234, a facsimile machine 236, and a medium 238. These devices are given as examples, and the possible range of devices is not limited thereto. Accordingly, other devices may be included among the plurality of devices 230, or one or more of the devices named above may be excluded, and other functionalities such as copying can be provided.

The printer 232 prints print data provided from the job control device 100 or print data stored in the multifunction device 200. The scanner 234 scans a document input to the multifunction device 200 and generates a scan image. The facsimile machine 236 transmits fax data to other multifunction devices or other facsimile machines over a telephone network or receives fax data from other multifunction devices or other facsimile machines over the telephone network.

The medium 238 stores data used or generated by other devices. The medium 238 may be a storage medium such as a hard disk drive (HDD), a secure digital card (SD), optical media or a smart card. The medium 238 may store data initially generated in the flow control of the job control unit 120.

For example, in order to perform copying, the job control unit 120 operates the scanner 234 to generate a scan image, confirms whether the scanner 234 has completed its operation, and operates the printer 232. The medium 238 temporarily stores the scan image between the completion of the scanning and the beginning of the printing.

Figure 3:
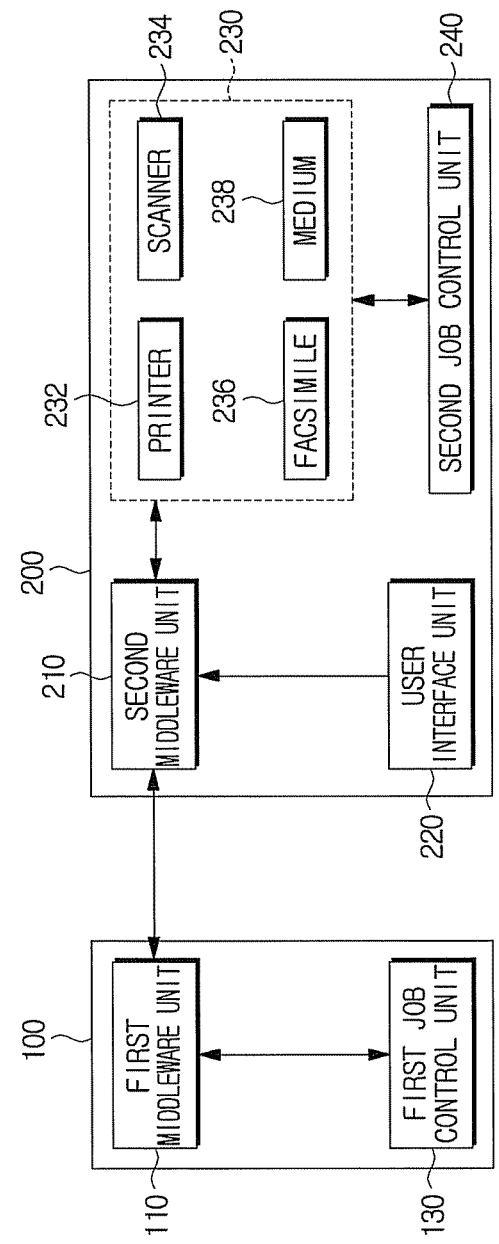
FIG. 3 is a block diagram of a job control system according to another embodiment of the present invention.

FIG. 3 is a block diagram of a job control system according to another exemplary embodiment of the present invention. The job control system comprises a job control device 100 and a multifunction device 200. As described in FIG. 2, the job control device 100 and the multifunction device 200 are connected to each other through middleware (such as, for example, the first and second middleware units 110, 220).

The job control system in FIG. 3 has a similar structure to the job control system described with reference to FIG. 2, so identical elements in the two embodiments are designated with the same reference numerals. Furthermore, the description of identical elements is not repeated, and only new elements are explained below.

The job control device 100 comprises the first middleware unit 110, and a first job control unit 130. The job control device 100 may be a user terminal or a job control dedicated device. The first middleware unit 110 has the same function as the first middleware unit 110 of FIG. 2, and the first job control unit 130 has the same function as the first job control unit 130 of FIG. 2.

The multifunction device 200 comprises the second middleware unit 210, a user interface unit 220, a plurality of devices 230, and a second job control unit 240. The second middleware unit 210, the user interface unit 220, and the plurality of devices 230 have the same functions as the corresponding devices of FIG. 2.

The second job control unit 240 performs functions of the conventional job control unit 1 shown in FIG. 1. Accordingly, the plurality of devices 230 can be controlled selectively by the first job control unit 130 in the job control device 100 or by the second job control unit 240 in the multifunction device 200.

When the plurality of devices 230 is controlled by the second job control unit 240 in the multifunction device 200, the first middleware unit 110 and the second middleware unit 210 are not used, so that the controlling by the second job control unit 240 in the multifunction device 200 has a more rapid processing speed than the controlling by the first job control unit 130 in the job control device 100.

However, it is difficult to change the software of the second control unit 240, so if a change in software is needed, the change in software can be accomplished by changing the first job control unit 130. Accordingly, the first job control unit 130 or the second job control unit 240 can be selectively used.

Figure 4:
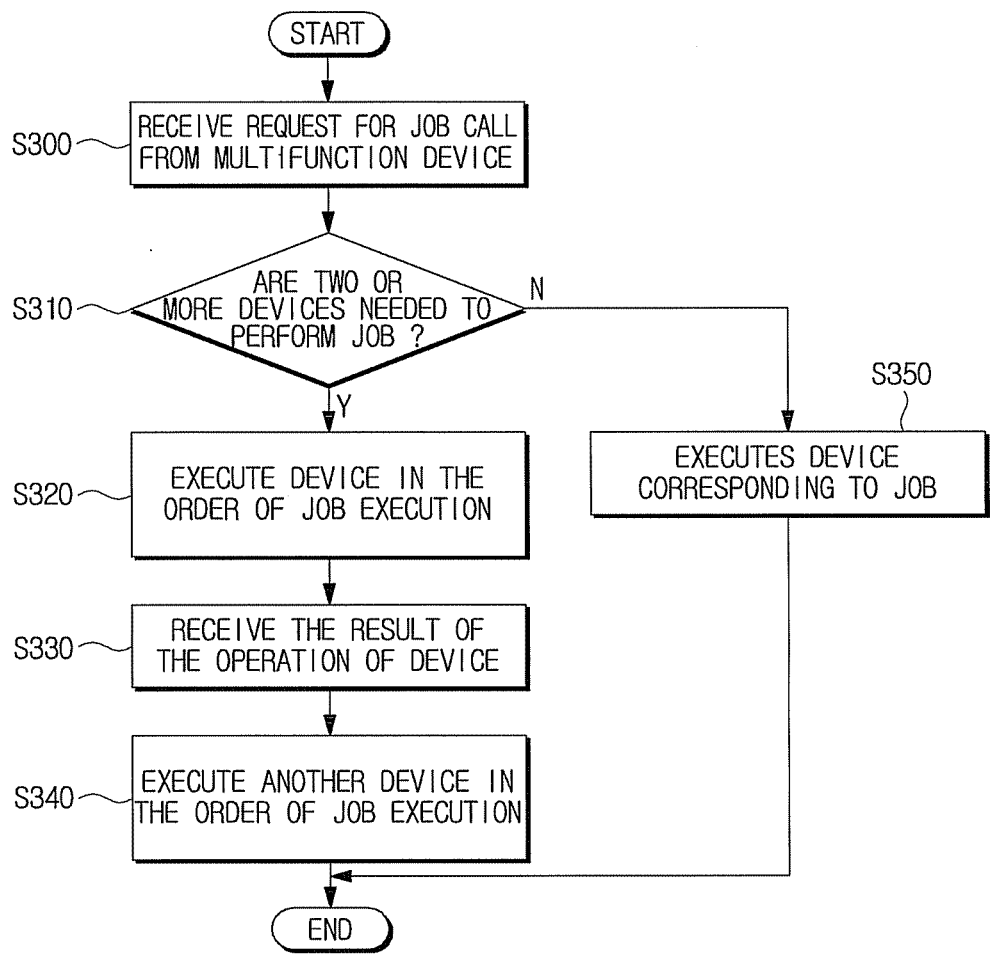
FIG. 4 is a flow chart illustrating the operation method of a job control device according to an embodiment of the present invention.

FIG. 4 is a flow chart illustrating the operation method of a job control device, with reference to FIG. 2, according to aspect of the present invention. In operation S300, if a user inputs a job execution request signal using the user interface unit 220, the user interface unit 220 requests a job call through the second middleware unit 210 and the job control device 100 receives the request for the job call from the multifunction device 200 through the first middleware unit 110.

After receiving the job call through the first middleware unit 110, the job control unit 120 determines what devices are needed to process the job from among the plurality of devices 230. If it is determined in operation S310-Y that two or more devices are needed to process the job, the job control unit 120 operates the first of the two or more devices in the order of job execution through the first middleware unit 110 in operation S320.

In operation S330, the device that executed the corresponding job by control of the job control unit 120 informs the job control unit 120 of the result of its operation through the second middleware unit 210, and the job control unit 120 is notified of the result of the operation of the device through the first middleware unit 110.

Subsequently, in operation S340, the job control unit 120 operates another of the two or more devices to perform the next function according to the flow control, that is, in the order of the execution of the job.

In operation 310, if it is determined in operation S310-N that only a single device is needed to perform the job, the job control unit 120 executes the single device needed to perform the job in operation S350 without the need for the flow control.

Figure 5:
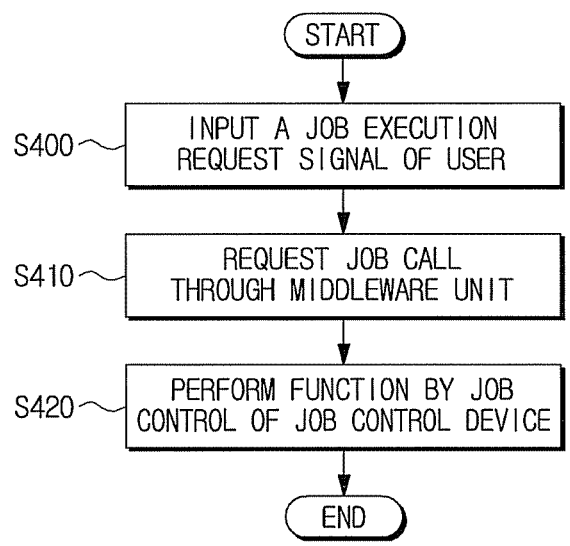
FIG. 5 is a flow chart illustrating the operation method of a multifunction device according to an embodiment of the present invention.

FIG. 5 is a flow chart illustrating the operation method of a multifunction device with reference to FIG. 2, according to an aspect of the present invention. In operation S400, the multifunction device 200 receives a job execution request signal from a user through the interface unit 220.

If the job execution request signal is input, the second middleware unit 210 requests a job call to the job control device 100 in operation 410. The job control device 100 receives the request for the job call from the multifunction device 200 through the first middleware unit 110.

Subsequently, in operation S420, if the second middleware unit 210 receives an interface call for a device from the job control device 100, the device performs its function.

As can be appreciated from the above description, a job control device, a multifunction device, and an operation method thereof facilitate the change of job control software without additional hardware by controlling jobs between a host and a multifunction device based on a middleware environment.

Furthermore, the host utilizes a middleware environment to control the multifunction device, so a rapid response speed is provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A job control device comprising:
a middleware unit that supports a connection with a multifunction device using middleware, the multifunction device comprising a plurality of devices having independent functions; and
a job control unit that determines at least one of the device that is needed to carry out a requested job, after receiving request for a job call through the middleware unit and executes the requested job by using the determined at least one of the device from among the plurality of devices;
wherein the middleware unit defines interfaces for the plurality of devices and constructs communication mechanism environmental elements of the defined interfaces; and
wherein the definition of the interfaces of for the plurality of devices is to state the name of the interface, a factor to provide when the interface is called, and a type of factor;
wherein if the multifunction device requests a job call, the job control unit selects and operates a device from among the plurality of devices to perform the job;
wherein if two or more devices are needed to perform the job, the job control unit selects and sequentially operates the two or more devices according to the order specified by the job.

2. The job control device of claim 1, wherein the middleware unit of the job control device interfaces with other middleware in the multifunction device.

3. The job control device of claim 1, wherein the connection of the job control device to the multifunction device is via a network.

4. A method of operating a job control device that controls jobs of a multifunction device comprising a plurality of devices having independent functions, the operation method comprising:
defining interfaces for the plurality of devices;
constructing communication mechanism environmental elements of the defined interfaces;
receiving a request for a job call from the multifunction device through a middleware unit;
determining at least one of the device that is needed to carry out a requested job; and
executing the requested job by using determined at least one of the device from among the plurality of devices;
wherein the definition of the interfaces of for the plurality of devices is to state the name of the interface, a factor to provide when the interface is called, and a type of factor;
wherein in the controlling of the job, if the multifunction device requests the job call, a device to perform the job is selected from among the plurality of devices in the multifunctional device and is operated;
wherein in the controlling of the job, when two or more devices are needed to perform the job, the job control unit selects and sequentially operates the two or more devices according to the order specified by the job.

5. The method of claim 4, wherein the middleware unit executes middleware programming selected from the group consisting of Common Object Request Broker Architecture (CORBA), Remote Method Invocation (RMI), and Component Object Model (COM+).

6. A multifunction device comprising:
a plurality of devices that have independent functions; and
a middleware unit that requests a job call to a job control device middleware,
wherein the job control device determines at least two of the devices that are needed to carry out a requested job, after receiving request for a job call, and the job control unit selects and sequentially operates the at least devices according to the order specified by the job.

7. The multifunction device of claim 6, further comprising a user interface unit that receives a job execution request signal from a user.

8. The multifunction device of claim 6, wherein the job control device is a user terminal or a job control dedicated device external to the multifunction device and that controls the devices.

9. The multifunction device of claim 6, wherein after the device called from the job control device executes the function, the middleware unit informs the job control device of the result of the operation of the device.

10. A method of operating a multifunction device comprising a plurality of devices having independent functions, the method comprising:
requesting a job call through a middleware unit that supports connection with a job control device using middleware of the multifunction device, the job control device determines at least one of the device that is needed to carry out a requested job, after receiving request for the job call; and
executing the requested job by using the determined at least two of the devices from among the plurality of devices;
sequentially operating the at least two devices according to the order specified by the job 11. The method of claim 10, receiving a job execution request signal from a user.

12. The method of claim 10, wherein the job control device is a user terminal or a job control dedicated device external to the multifunction device.

13. The method of claim 12, wherein the multifunction device further comprises a job control device that is internal to the multifunction device and that does not connect to the multifunction device through a middleware unit, and wherein the method further comprises selecting the job control device that connects to the multifunction device through middleware or the job control device that is internal to the multifunction device.

14. A job control system comprising a multifunction device comprising a plurality of devices having independent functions and having a first middleware unit; and a job control device comprising a first job control unit that controls a performing of a job by at least one device from among the plurality of devices and having a second middleware unit in communication with the first middleware unit, wherein the first middleware unit supports connection of the job control unit with the multifunction device to control a performing of a job by at least one device from among the plurality of devices, wherein the second middleware unit supports connection of the multifunction device with the job control device to provide a job call request to the job control device via the first middleware unit, wherein the job control device determines at least two of the devices that are needed to carry out a requested job, after receiving request for the job call, and wherein the determined at least two of the device from among the plurality of devices executes a requested job, wherein the job control unit selects and sequentially operates the at least two devices according to the order specified by the job.

15. The job control system of claim 14, wherein the multifunction device further comprises a user interface unit that receives a job execution request signal from a user.

16. The job control system of claim 14, wherein the job control device is a user terminal or a job control dedicated device external to the multifunction device.

17. The job control system of claim 14, wherein the multifunction device and the job control device are physically separable from each other and are connected by a cable.

18. The job control system of claim 14, wherein the multifunction device includes a printer, a fax machine, a scanner, a storage medium or a combination thereof.

19. The job control system of claim 14, wherein the multifunction device includes a second job control unit and wherein the performing of a job by at least one device from among the plurality of devices is selectively controlled by the first job control unit or the second job control unit.

\* \* \* \* \*

UNITED STATES PATENT AND TRADEMARK OFFICE
CERTIFICATE OF CORRECTION

PATENT NO.       : 8,804,164 B2
APPLICATION NO.  : 12/034879
DATED            : August 12, 2014
INVENTOR(S)      : Hyung-sik Byun It is certified that error appears in the above-identified patent and that said Letters Patent is hereby corrected as shown below:

In the Claims

Column 8, Line 54, In Claim 10, Delete "job" and insert -- job. --, therefor.

Column 9, Line 21, In Claim 14, Delete "device" and insert -- devices --, therefor.

Signed and Sealed this
Twenty-third Day of December, 2014

Michelle K. Lee
*Deputy Director of the United States Patent and Trademark Office*